(No Model.)
J. W. ADCOCK.
CORN PLANTER.
No. 272,111. Patented Feb. 13, 1883.
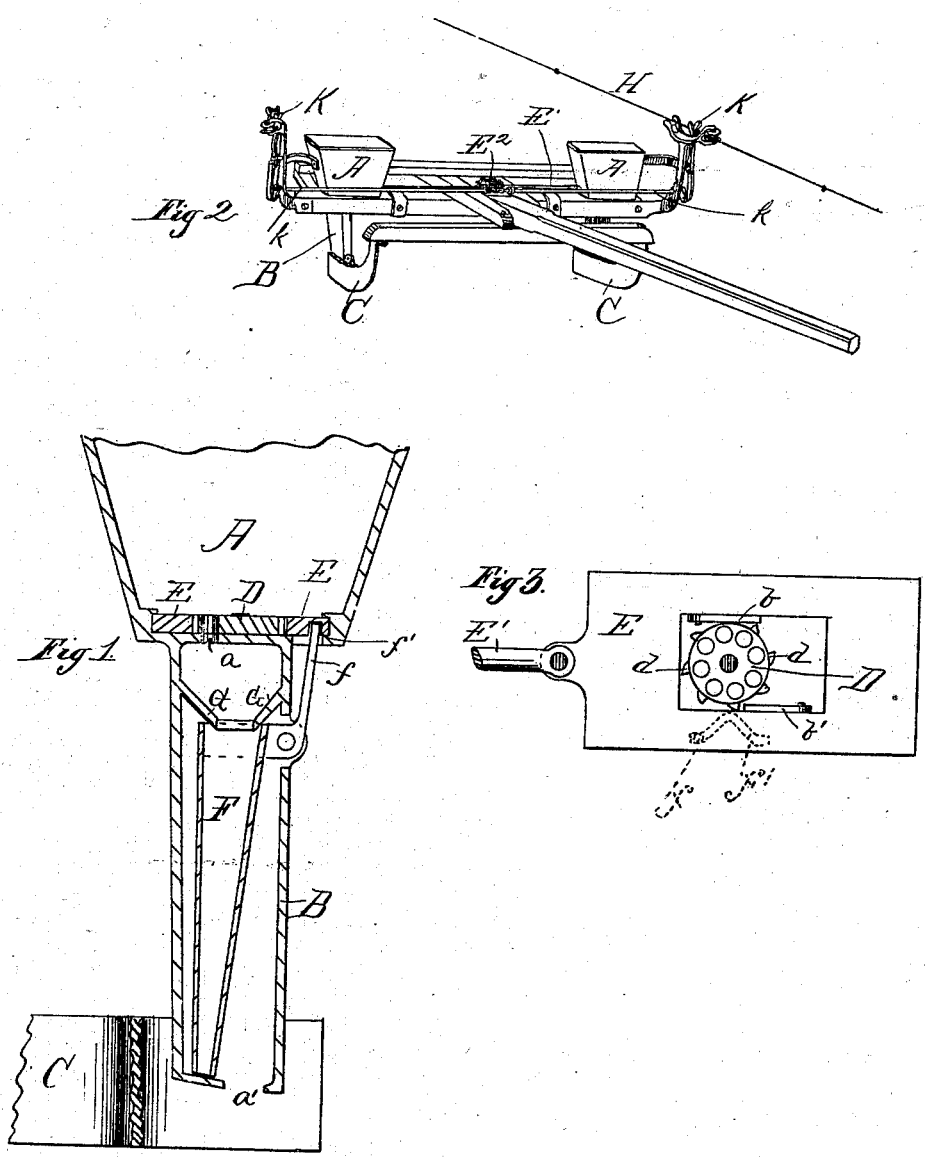
Witnesses:
S. Everett Brown
H. W. Munday
Inventor:
Joseph W. Adcock
per Munday, Evarts & Adcock
his Attorneys

UNITED STATES PATENT OFFICE.

JOSEPH W. ADCOCK, OF UTAH, ILLINOIS.

CORN-PLANTER.

SPECIFICATION forming part of Letters Patent No. 272,111, dated February 13, 1883.

Application filed October 13, 1882. (No model.)

*To all whom it may concern:*

Be it known that I, JOSEPH W. ADCOCK, a citizen of the United States, residing in Utah, in the county of Warren and State of Illinois, have invented a new and useful Improvement in Corn-Planters, of which the following is a specification.

The present invention relates to improvements in the dropping or seed-discharging mechanism of corn-planters, and more particularly to such mechanism when operated by wire or rope check-rowers.

In corn-planters heretofore in use the seed usually has to fall some three or four inches, after it is discharged, to reach the ground, and while falling through this space it is carried forward from three to eight inches after it is dropped or discharged, depending upon the rate the planter is moving at the time the seed is discharged. The dropping mechanism is therefore adjusted in relation to the knots or balls on the wire or rope to drop the seed correctly when the planter is moving at some one particular speed; but the speed or rate at which even the same team of horses will pull or propel the planter varies considerably at different times, owing to various causes, as the resistance of the planter is greater or less, or as it is moving uphill or downhill, or as the horses happen to be fresh or fatigued, and on account of this irregular gait great irregularity frequently occurs in the check or cross rows, owing to the fact that at some times, perhaps, the seed will be carried only two or three inches after it is dropped, and at other times eight or ten inches, perhaps.

The object of the present invention is to obviate the irregularity in the check-rows due to the varying speed at which the planter may move, or, in other words, to render the operation of the dropping mechanism independent of the rate the planter is moving, and thus also obviate the necessity of adjusting the machine to any particular speed.

The principle of my invention consists in bringing the seed receptacle or valve in the heel of the runner from which the measured quantity of seed is discharged to an absolute rest at the instant the seed is discharged therefrom by means of the knots or balls on the wire or rope which stretches across the field— that is to say, in stopping its forward motion with the planter at that instant, so that the seed, being thus deprived of its forward momentum will fall vertically down to the earth, instead of being carried forward a varying distance after being discharged, according to the rate of motion of the planter.

In practicing my invention any suitable mechanism or means may be employed for operating the seed-discharging receptacles or valves from the stationary knots or balls on the rope or wire, so as to stop the forward motion of the seed at the moment of discharge. Of course, however, it will be understood that this connecting or operating mechanism should be so arranged or proportioned as to cause the seed valve or receptacle in the heel of the runner to slide backward in relation to the runner at just the rate the planter is being propelled forward, so that the seed valve or receptacle, at the moment of discharge, will be stationary in respect to the ground.

In the accompanying drawings, which form a part of this specification, I have shown what I deem one of the preferable methods of practicing my invention.

In the drawings, Figure 1 is a longitudinal section through one of the seed-boxes of a device embodying my invention. Fig. 2 is a perspective view of the front end of a corn-planter, showing any ordinary mechanism for operating the seed-slides by means of a wire or rope. Fig. 3 is a detail plan view of the rotary seed slide or plate and mechanism for operating the same.

In the drawings similar letters of reference indicate like parts.

A represents the seed-boxes, B the seed tubes or legs, and C the runner or furrow-opener.

D represents a rotary seed plate or slide, by which measured quantities of seed are discharged through the seed-opening *a* in the bottom of the seed-box. The seed-plates are rotated by means of the reciprocating slides E— one in each seed-box—connected together by the bar E' and bearing pawls *b b'*, which engage with ratchets or projections *d d* on the rotary seed-plates as the slides E are reciprocated. The seed, as it is discharged through the opening *a*, falls into the seed-discharging valve or receptacle F, which is operated by the pivoted arm or lever $f$, the end of which fits in a grooved cam, $f'$, on the slide E.

G G are guards or deflecting-plates for guiding the seed into the valve F as it falls through the opening $a$.

Any ordinary mechanism for operating the seed-plates from the stationary knots or balls on the wire or rope H may be employed. That which I have indicated in the drawings, for sake of illustration, consists of a forked pivoted lever, K, connected with the rock-shaft $k$, which is provided with an arm, by means of which the bar E' is operated through any suitable connecting mechanism, $E^2$. The arms of the lever $f$ are so proportioned in relation to the cam $f'$ and the motion of the slides E, communicated from the balls or knots on the wire or rope, that the end of the valve F will move backward in the heel of the runner at just the rate the runner moves forward in the ground, so that at the time the seed is discharged through the opening $a'$ in the heel of the runner it will, in fact, have no forward momentum with the planter and fall vertically to the ground. In other words, the mechanism is so proportioned that the lower end of the seed-valve F has just the same motion as the upper or forked end of the lever K, which of course is stationary in respect to the ground when it comes in contact with one of the balls or knots on the wire or rope by which it is operated. The lever $f$ or valve F may, if preferred, be connected with some other moving part of the mechanism than the slide E—as, for example, the rock-shaft, the seed-slide plate, or other part—and of course if any other check-rower mechanism is used the valve may be connected with any convenient moving part thereof, care being taken that the parts be so proportioned that the backward motion of the seed-valve in the heel of the runner be equal or about equal to the motion of the device which engages with the balls on the wire or rope—that is to say, to the forward motion of the planter—so that the seed at the moment of final discharge will have no forward momentum.

If preferred, also, instead of employing a separate seed valve or receptacle in the heel of the runner, a vertical rotary seed plate or slide may be used, having seed cups or receptacles in its periphery, the cups being filled as they pass under the seed-box, and the seed discharged as the cups come around over the discharge-opening $a'$. In this method of practicing my invention the vertical seed-plates are of course intermittently rotated, by means of the knots or balls on the wire or rope, in the same direction that the foot of the valve F moves.

I claim—

1. The corn-planter provided with a seed-discharging valve or receptacle, and means for bringing said valve or receptacle to a state of rest in respect to the ground at the time the seed is discharged therefrom—that is to say, for moving the seed-discharging valve and the seed contained therein backward in the heel of the runner at the same rate the runner is moving forward at the moment the seed is discharged—substantially as specified.

2. In a corn-planter, the combination of the seed-discharging valve or receptacle with a wire or rope provided with balls or knots at intervals, and means for operating the seed-discharging valve or receptacle to stop the forward motion of the seed contained therein at the time it is discharged from the planter, substantially as specified.

3. In a corn-planter, the combination of a seed-slide, leg B, provided with seed-discharge opening $a'$, and backward-moving seed valve or receptacle adapted to carry the seed with it over said discharge-opening, so as to stop the forward motion of the seed with the planter at the time it is discharged, substantially as specified.

JOSEPH W. ADCOCK.

Witnesses:
WM. ADCOCK,
JOHN H. CHAMPION.